United States Patent
Gupte et al.

(10) Patent No.: US 9,204,157 B2
(45) Date of Patent: Dec. 1, 2015

(54) VIDEO COMPRESSION SEARCHING REFERENCE FRAME IN HYBRID GROWING-WINDOW AND SLIDING-WINDOW

(75) Inventors: Ajit Deepak Gupte, Bangalore (IN); Hetul Sanghvi, Bangalore (IN); Herve Catan, Castagniers (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1016 days.

(21) Appl. No.: 13/330,417

(22) Filed: Dec. 19, 2011

(65) Prior Publication Data
US 2013/0128975 A1  May 23, 2013

(30) Foreign Application Priority Data
Nov. 18, 2011 (EP) .................................... 11290531

(51) Int. Cl.
*H04N 19/433* (2014.01)
*H04N 19/593* (2014.01)

(52) U.S. Cl.
CPC ............ *H04N 19/433* (2014.11); *H04N 19/593* (2014.11)

(58) Field of Classification Search
None
See application file for complete search history.

(56) References Cited

U.S. PATENT DOCUMENTS

| | | | | |
|---|---|---|---|---|
| 5,696,698 | A * | 12/1997 | Herluison et al. | 345/557 |
| 6,067,321 | A * | 5/2000 | Lempel | 375/240.24 |
| 6,108,039 | A * | 8/2000 | Linzer et al. | 375/240.11 |
| 7,006,100 | B2 * | 2/2006 | Phong et al. | 345/557 |
| 8,675,737 | B2 * | 3/2014 | Nagori | 375/240.16 |
| 2011/0069751 | A1* | 3/2011 | Budagavi | 375/240.02 |
| 2011/0103481 | A1* | 5/2011 | Nagori | 375/240.16 |
| 2012/0063516 | A1* | 3/2012 | Kwon et al. | 375/240.16 |

* cited by examiner

*Primary Examiner* — Kate Luo
(74) *Attorney, Agent, or Firm* — Lawrence J. Bassuk; Ronald O. Neerings; Frank D. Cimino

(57) ABSTRACT

A system and method for organizing pixel information in memory. A method according to an embodiment of the disclosure includes storing data representative of pixels of a scene in a growing window ("GW") portion of a reference frame in an on-chip memory, storing data representative of pixels of the visual scene in a sliding window ("SW") portion of the reference frame thereby forming a hybrid window, searching the memory to locate a portion of the stored data that corresponds with data representative of pixels in a current frame descriptive of the scene, performing motion estimation according to results of the search, generating a compressed version of the current frame according to results of the motion estimation, and storing the compressed version for later visual rendering. The system includes a processing unit and a video encoder. The processing unit includes an on-chip memory. The video encoder includes a motion estimation engine and a compression unit.

11 Claims, 10 Drawing Sheets

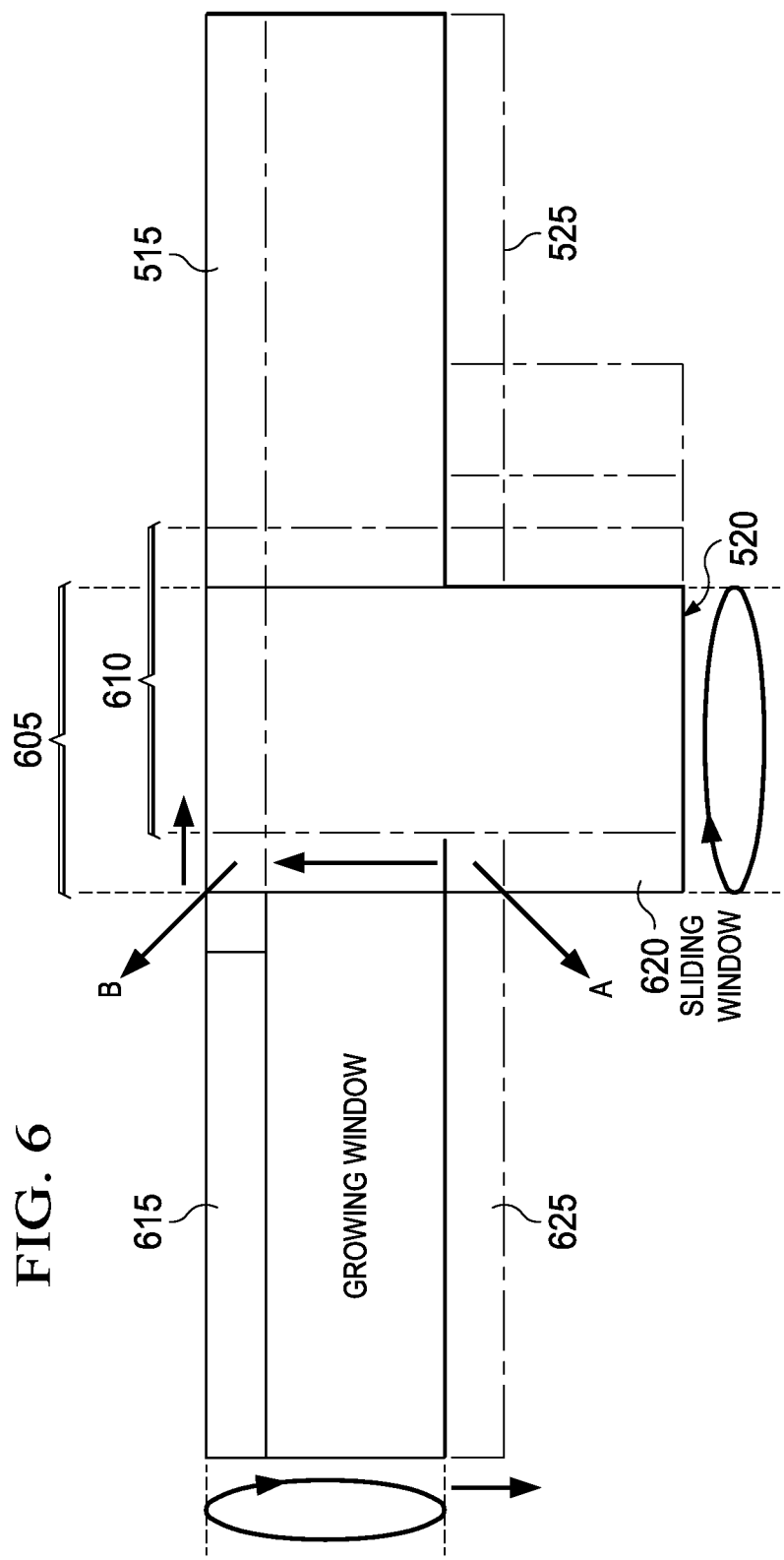

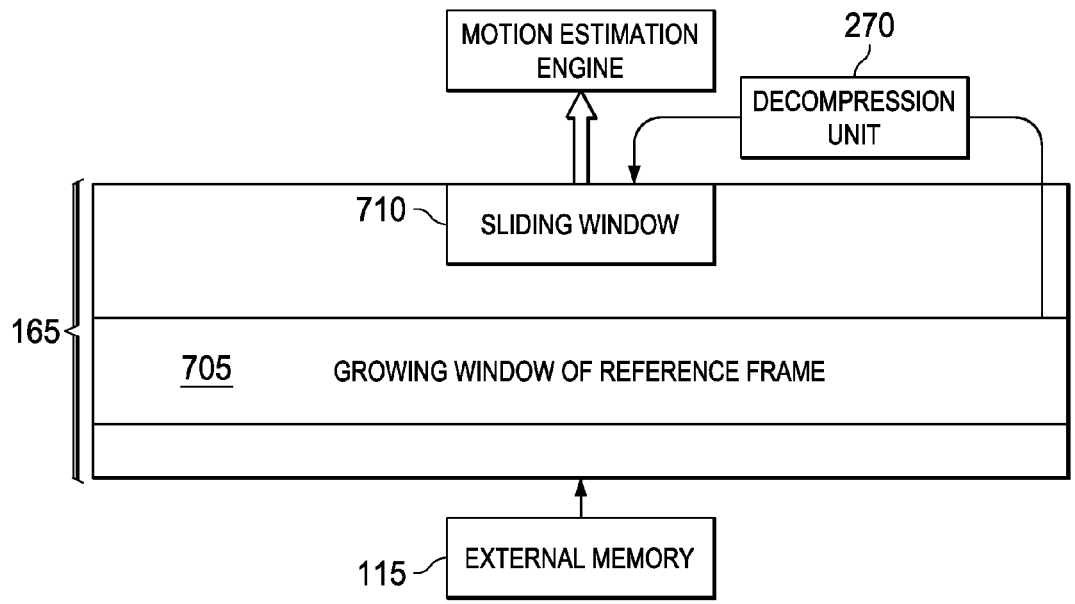
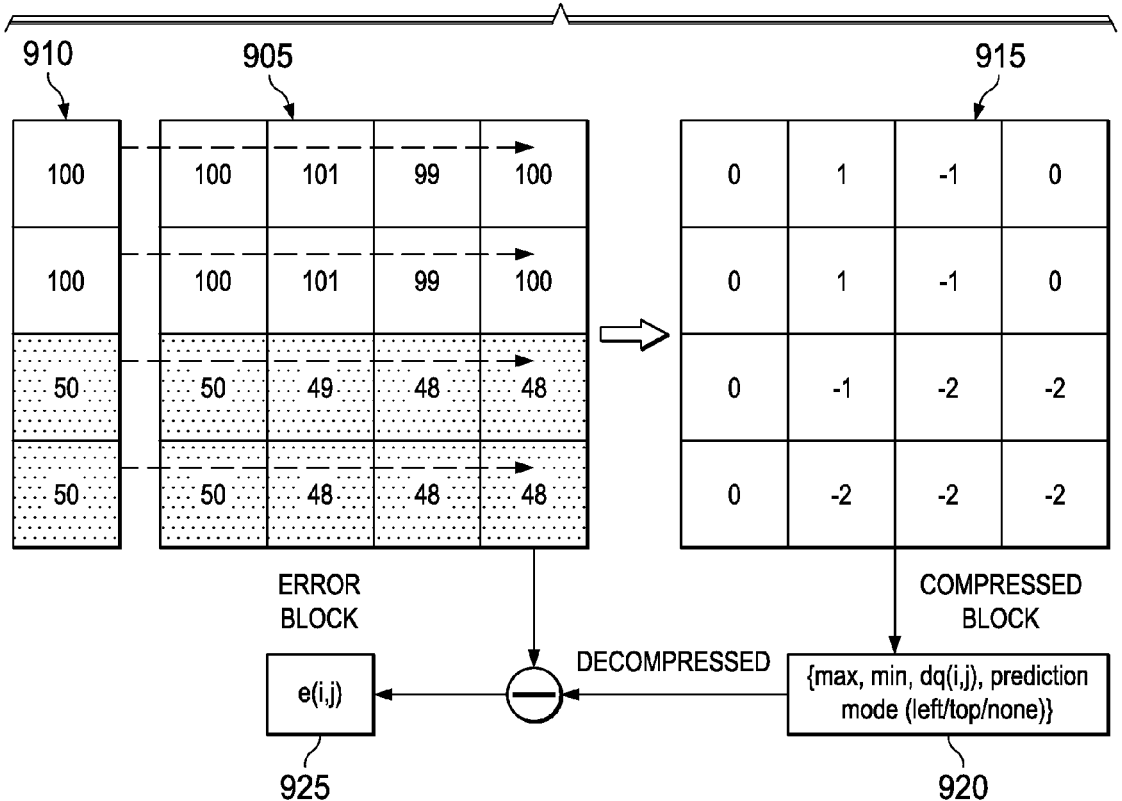

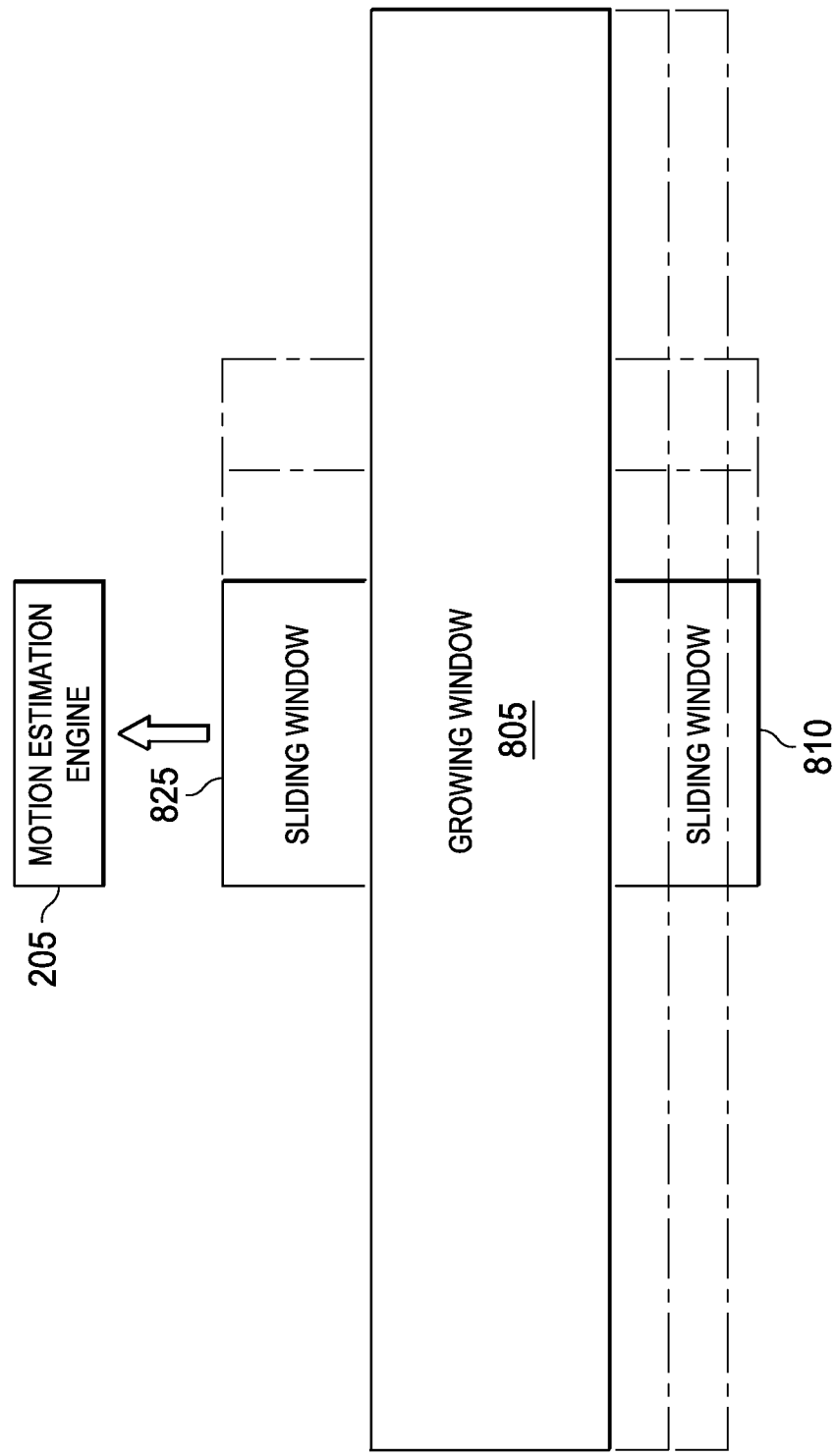

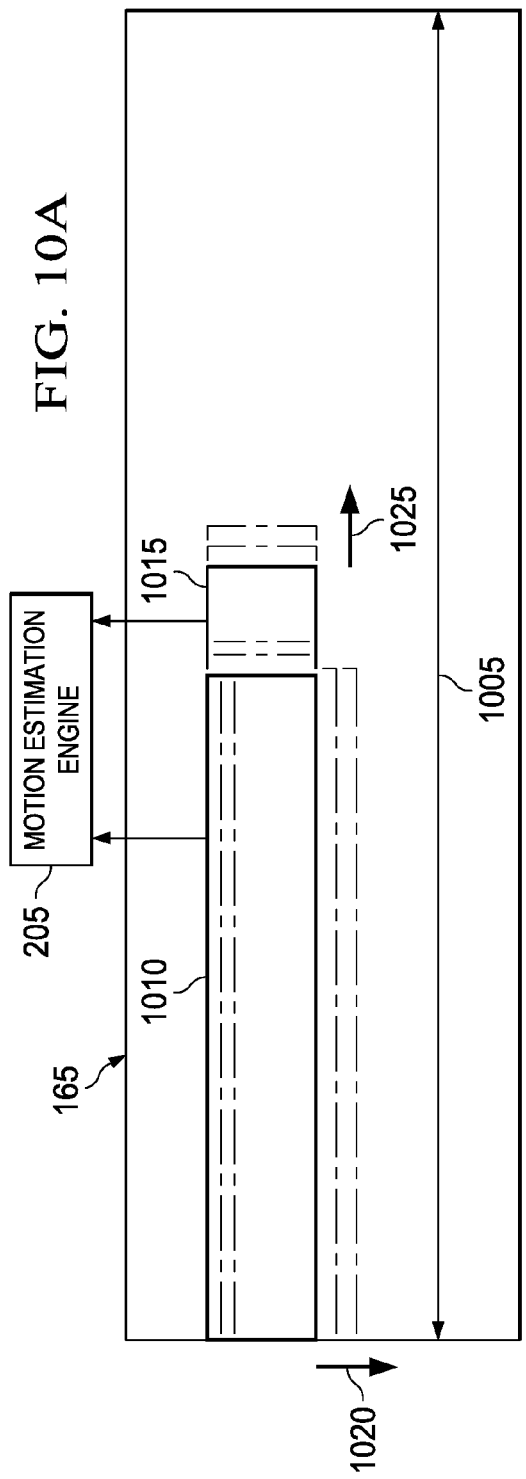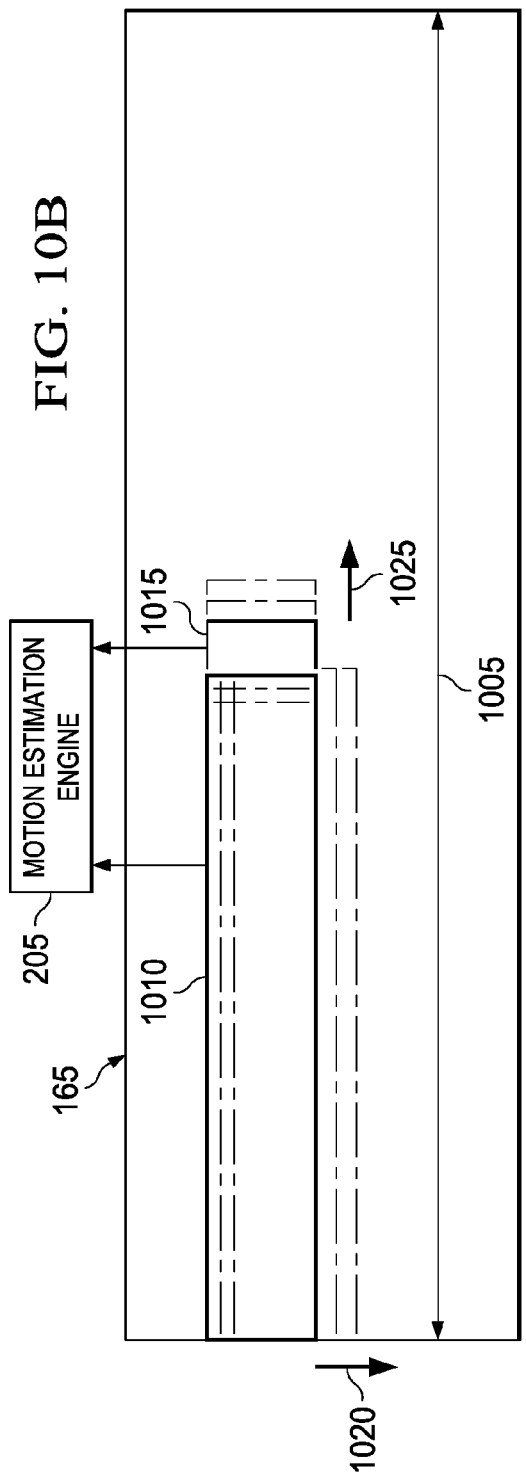

VIDEO COMPRESSION SEARCHING REFERENCE FRAME IN HYBRID GROWING-WINDOW AND SLIDING-WINDOW

This application claims priority from European provisional patent application, application number 11290531.0 filed on Nov. 18, 2011, entitled "PARTIAL-WRITES TO ECC (ERROR CHECK CODE) ENABLED MEMORIES", which is incorporated herein by reference in its entirety.

TECHNICAL FIELD

Embodiments of the disclosure relate to a method and system of compressing a video signal and of organizing pixel information in memory.

BACKGROUND

Often, video compression is performed to reduce the quantity of data used for representing a digital image and to process the digital image faster while transferring the digital image from one device to another. Video compression and video decompression are performed in order to reduce channel bandwidth and to reduce memory requirements. A video codec includes a video encoder to perform video compression and a video decoder to perform video decompression. A video codec may also be referred to as a video encoder.

One of the techniques used in video compression is motion estimation. Motion estimation includes extracting motion information from a video sequence. The video sequence can be defined as a combination of one or more digital images (frames). Extracting the motion information from the video sequence includes determining motion vectors. The motion vectors describe spatial displacement of data in adjacent frames in the video sequence. In one example, a motion vector is a two-dimensional vector that represents an offset from coordinates in a current frame to the coordinates in a reference frame. In one example, motion estimation can be defined as a technique where a current frame is compared with a previous frame and information about similar pixels is stored and reused to generate a frame subsequent to the current frame. In another example, motion estimation involves searching for a best match between every block of pixels in the current frame and a block of pixels in the previous frame, hereinafter referred to as the reference frame. The pixel value information, after a search, can include motion vectors, pixel values, or any other pixel information required during the compression. In one example, motion compensation includes using the motion vectors to generate one or more frames from a current frame.

In an existing technique, motion estimation involves fetching a portion of the reference frame from an external memory (for example a double data rate (DDR) memory) and storing it in an on-chip memory (for example a static random access memory (SRAM)) present inside the video codec. Pixels in a frame may be grouped into blocks, and these blocks may be called macroblocks. Motion estimation involves searching for a best match between every block of pixels in the current frame with a block of pixels in the reference frame. Blocks of pixels may be accessed using either a sliding window technique or a growing window technique. The sliding window technique allows reuse of reference frame data in a horizontal direction. Fetching relatively large portion of the reference frame data from external memory each time when a search is to be performed makes the sliding window technique bandwidth inefficient. The growing window technique allows reuse of data from the reference frame in both horizontal and vertical directions. For this, the reference data for entire row of macro-blocks needs to be stored in on-chip memory so that it can be used by the next macro-block row. This makes growing window technique memory inefficient. Thus, both sliding window and growing window techniques impose at least one limitation of bandwidth requirement and memory requirement. There has been a need to reduce both the bandwidth required by the sliding window technique and the amount of memory required by the growing window technique.

SUMMARY

An example of a method of compressing a video signal that represents a physical scene in a video encoder having an on-chip memory includes storing data representative of pixels in a growing window ("GW") plurality of rows and a GW plurality of columns of a reference frame in a GW portion of the on-chip memory, storing data representative of pixels in a first sliding window ("SW") plurality of rows and a first SW plurality of columns of the reference frame includes in an SW portion of the on-chip memory, searching the on-chip memory to locate a portion of the stored data that corresponds with a portion of data representative of pixels in a current video frame descriptive of the physical scene, performing motion estimation, generating a compressed version of the current video frame according to results of the motion estimation, and storing the compressed version of the current video frame for later visual rendering of an image of the physical scene.

Another example of a method of compressing a video signal that represents a physical scene in a video encoder having an on-chip memory includes storing data representative of pixels in a GW plurality of rows and a GW plurality of columns of a reference frame in a GW portion of the on-chip memory, the GW plurality of rows including at least as many rows as a row dimension of a predefined pixel block but less than all the rows of the reference frame, the GW plurality of columns including at least as many columns as a column dimension of the predefined pixel block; storing data representative of pixels in an SW plurality of columns and an SW plurality of rows of the reference frame in an SW portion of the on-chip memory, the SW plurality of columns including at least as many columns as the column dimension of the predefined pixel block but less than all the columns of the reference frame, the SW plurality of columns including portions of each row of the first SW plurality of rows, the SW plurality of rows including at least as many rows as the row dimension of the predefined pixel block but less than all the rows of the reference frame; searching the on-chip memory to locate a portion of the stored data that corresponds with a portion of data representative of pixels in a current video frame descriptive of the physical scene; performing motion estimation; generating a compressed version of the current video frame according to results of the motion estimation; and storing the compressed version of the current video frame for later visual rendering of an image of the physical scene.

An example of a system includes a processing unit for processing a video signal that represents a physical scene. The processing unit includes an on-chip memory having a GW portion to store data representative of pixels in a GW plurality of rows and a GW plurality of columns of a reference frame and having an SW portion to store data representative of pixels in an SW plurality of rows and an SW plurality of columns of the reference frame. The processing unit also includes a video encoder. The video encoder includes a motion estimation engine to search the on-chip memory to locate a portion of the stored data that corresponds with a portion of data representative of pixels in a current video frame descriptive of the physical scene and perform motion estimation. The video encoder also includes a compression unit to generate a compressed version of the current video frame according to results of the motion estimation. The processing unit is electronically coupled to an external memory, the external memory configured to store the compressed version of the current video frame for later visual rendering of an image of the physical scene.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the disclosure.

FIG. 6 is a schematic representation of a hybrid window technique, in accordance with another embodiment;

FIG. 7 is a schematic representation of a compressed growing window technique, in accordance with one embodiment;

FIG. 8 is a schematic representation of a hybrid window technique, in accordance with yet another embodiment;

FIG. 9 is an exemplary illustration of an intra-prediction based scalar quantization technique;

FIGS. 10a and 10b are schematic representations of hybrid window technique, in accordance with one embodiment;

DETAILED DESCRIPTION OF THE EMBODIMENTS

Various embodiments discussed in this disclosure pertain to a method and system of compressing a video signal and organizing pixel information in memory.

Figure 1:
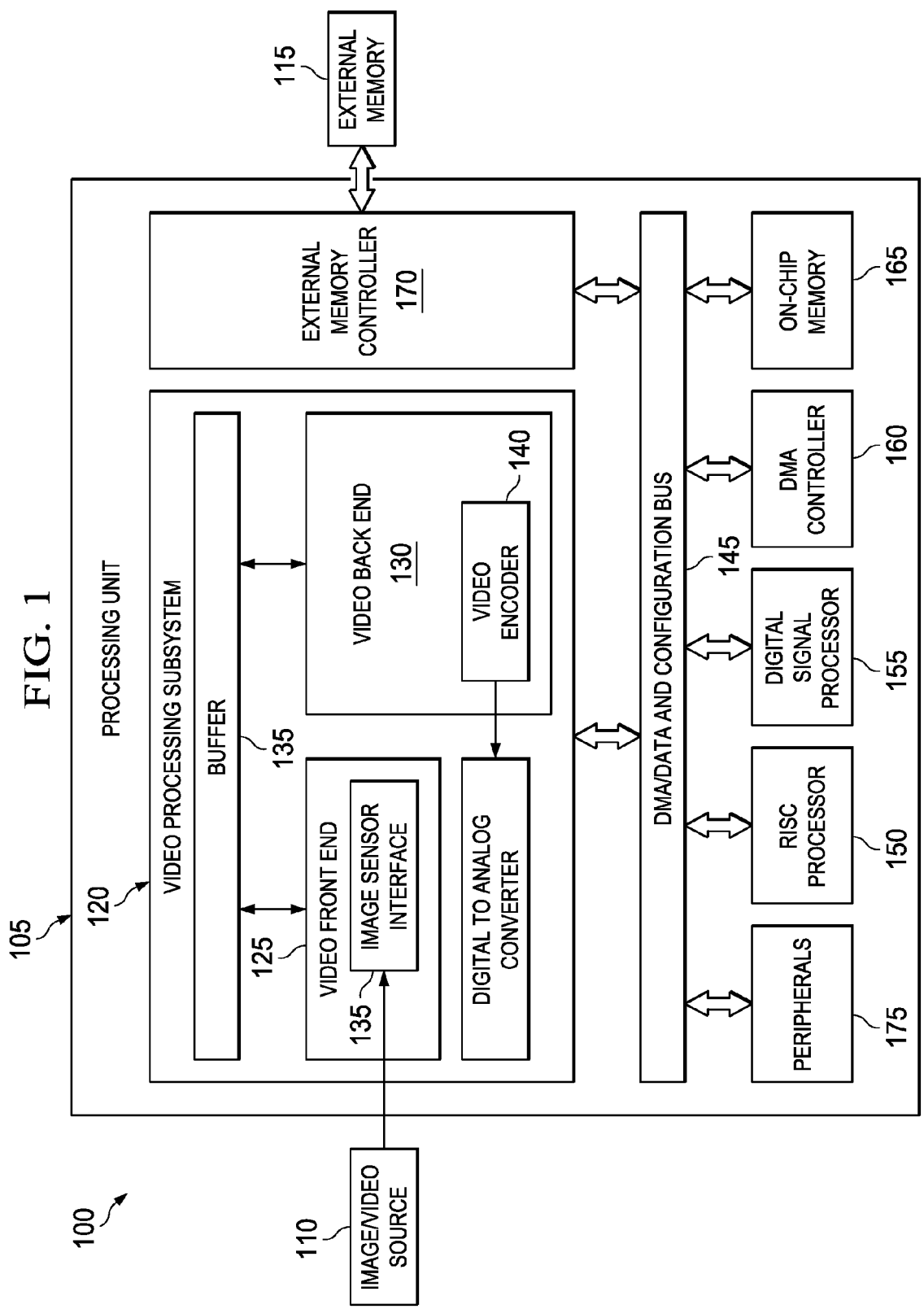
FIG. 1 is a block diagram of a system for compressing a video signal.

Referring to FIG. 1 now, a system 100 for compressing the video signal includes a processing unit 105. The processing unit 105 is in electronic communication with an image/video source 110. Examples of the image/video source 110 can include, but are not limited to, a digital camera, a camcorder, a mobile device or a device that captures and provides a video signal indicative of a physical scene. The processing unit 105 is in electronic communication with an external memory 115. An example of the external memory 115 includes a double data rate (DDR) memory. The processing unit 105 includes a video processing subsystem 120 for processing the video signal. The video processing subsystem 120 includes a video front end 125 and a video back end 130. The video front end 125 includes an image sensor interface 135 that receives the video signal. The video back end 130 includes a video encoder 140 for performing motion estimation of frames in the video signal. The video encoder 140 is also able to generate a compressed version of the frames in the video signal according to results of the motion estimation. In some embodiments, the video encoder 140 can include a separate unit for generating compressed version of the frames of the video signal. The processing unit 105 includes a direct memory access (DMA) data and configuration bus 145. The DMA data and configuration bus 145 transfer data and control signals between components in the processing unit 105.

The processing unit 105 includes a reduced instruction set computing (RISC) processor 150 that functions as a central processing unit. The RISC processor 150 is operable to perform input or output functions, and system control functions. The processing unit 105 includes a digital signal processor (DSP) 155. The DSP 155 is operable to process real-time signal processing software algorithms. In one embodiment, the DSP 155 is operable to process codecs. A codec can be defined as a video coding or decoding software.

The processing unit 105 includes a DMA controller 160 for direct memory accessing. The processing unit 105 includes an on-chip memory 165 that stores frames of the digital video. An example of the on-chip memory 165 is a static random access memory (SRAM). The processing unit 105 can include other memories for storing the codecs. The processing unit 105 also includes an external memory controller 170 for controlling the external memory 115.

The processing unit 105 includes one or more peripherals 175, for example a communication peripheral to transmit one or more frames of the digital video. Examples of the communication peripheral include ports and sockets. The peripherals 175 can also include a system peripheral such as a timer and temporary storage such as a random-access memory.

The video encoder 140 can be based on one of an H.264, MPEG4, MPEG2, MJPEG, PEG, WMV9/VC1 standard. In one embodiment, the processing unit 105 includes video co-processors for accelerating video processing. For example, the processing unit 105 can include a High Definition Video/Imaging Co-Processor (HD-VICP) to accelerate video processing and increase efficiency. In some embodiments, the processing unit 105 can include additional components which are not described in the system 100.

In one example, the video encoder 140 includes a firmware having a combination of software instructions and hardware components. The video encoder 140 is capable of video encoding and video decoding.

Figure 2:
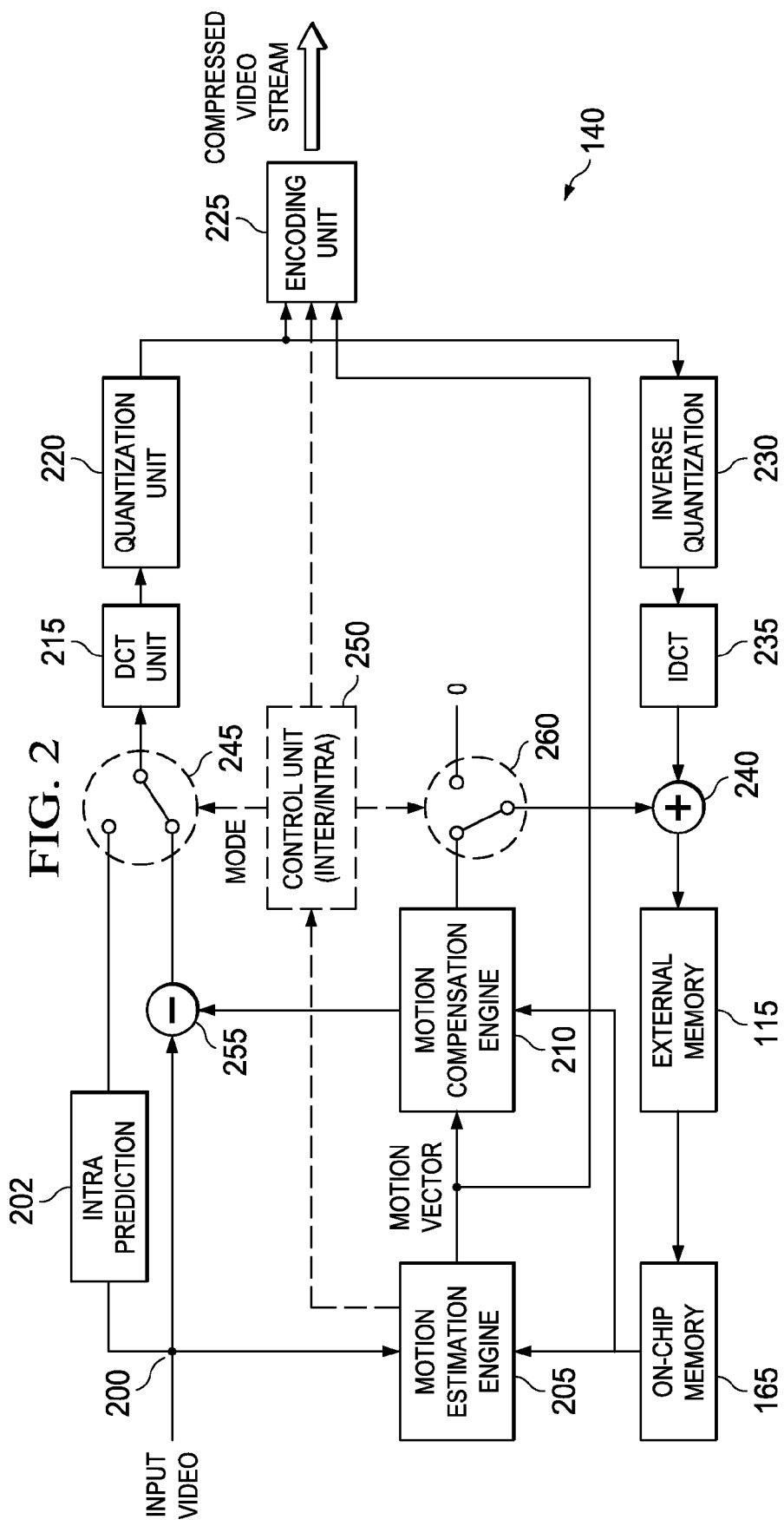
FIG. 2 is a block diagram of a video encoder for performing motion estimation, in accordance with an embodiment.

Referring to FIG. 2 now, the video encoder 140 includes a motion estimation engine 205 coupled to an input port 200. Motion estimation is the process of determining motion vectors that help in creating motion compensated prediction frame from a reference frame. Examples of the motion estimation technique to generate motion vectors include, but are not limited to, a block matching algorithm, phase correlation and frequency domain methods and pixel recursive algorithms. The video encoder 140 also includes a motion compensation engine 210. The motion compensation engine 210 is configured to communicate with motion estimation engine 205 and is operable to receive the motion vectors. One or more motion compensation techniques can be used to describe the current frame as a transformation of the reference frame. Examples of the motion compensation techniques include, but are not limited to, block motion compensation, variable block-size motion compensation, overlapped block motion compensation and Quarter Pixel (QPel) and Half Pixel motion compensation. The video encoder 140 also includes a discrete cosine transform (DCT) unit 215, a quantization unit 220, a encoding unit 225, a inverse quantization unit 230, a inverse DCT unit 235, a adder 240, a first mode switch 245, a control unit 250, a subtractor 255, and a second mode switch 260.

The DCT unit 215 is configured to communicate with the first mode switch 245. The first mode switch 245 is operable by the control unit 250 that switches between two modes, i.e. intra-prediction mode and inter-prediction mode. During the intra-prediction mode the first mode switch 245 is connected to the input port 200 through the intra-prediction block 202. During inter-prediction mode, the first mode switch 245 is connected to the subtractor 255. The DCT unit 215 converts a signal from a spatial domain to a frequency domain and may express a sequence of finite data points in terms of a sum of cosine functions having different frequencies. The quantization unit 220 in communication with the DCT unit 215 quantizes output of the DCT unit 215 by constraining values in a continuous set of values to a discrete set.

The inverse quantization unit 230 performs inverse quantization (inverse operation of the quantization unit 220) of a quantized video signal. The inverse DCT unit 235 in communication with the inverse quantization unit 230 performs the inverse operation of the DCT unit 215 to generate the reconstructed residual video signal which is added to the predicted signal to generate reconstructed video signal. The video signal is then stored in the external memory 115. The on-chip memory 165 is in communication with the motion estimation engine 205 and the motion compensation engine 210. The on-chip memory 165 can be an SRAM. The adder 240 is also in communication with the second mode switch 260. The second mode switch 260 is operable by the control unit 250 that switches between two modes. During a first mode, the second mode switch 260 is connected to the motion compensation engine 210. Further, the subtractor 255 is in communication with the input port 200 and the motion compensation engine 210 to provide an output to the first mode switch 245.

Further, the control unit 250 is also in communication with the motion estimation engine 205 and the encoding unit 225. The encoding unit 225 is in communication with the quantization unit 220 to encode quantized data to generate an encoded bit stream. Examples of techniques for generating the encoded bit stream include, but are not limited to, Huffman coding, Lempel-Ziv coding and arithmetic coding.

In one embodiment, a video signal is received at the input port 200. The video signal includes a plurality of frames. In video compression techniques, individual frames in the plurality of frames are classified as intra-predicted (I) frames or inter-predicted (P/B) frames. The I-frame is an 'Intra-coded frame, in effect a fully-specified picture, like a conventional static image file. The inter-predicted frames hold only the changes in a current frame from a previous frame. A control (inter/intra) unit 250 decides whether an inter-prediction technique (e.g., using motion estimation to arrive at a prediction for the current macro block by using the pixels from previously coded frames) or an intra-prediction technique (e.g., using the macro block coded using previously coded pixels in the same frame) may be used for a macro block. A first frame among the plurality of frames received at the input port 200 is identified as the I-frame, by a control unit 250. During the intra-prediction mode, the first mode switch is operable to receive the first frame at the input port 200. Quantized data from the quantization unit 220, representing the reference frame, is used as part of encoding operation by the encoding unit 225 to generate an encoded bit stream. Further, the reference frame is reconstructed using the quantized data using the inverse quantization unit 230 and the inverse DCT unit 235. The reference frame is then stored in the external memory 115. The reference frame may be used by the motion estimation engine 205 or the motion compensation engine 210.

A second frame (P-frame) among the plurality of frames received at the input port 200 is identified as the P-frame by the control unit 250. The second frame is represented using the inter-prediction technique, i.e. the second frame is coded as a representation from the reference frame. A reference frame is a previously coded frame which is either another P frame or an I frame. The data correlation between successive frames is used in motion estimation. In one example, a sample region in the reference frame that matches a macroblock of a second frame is found and a motion vector is generated representing the shift of the macroblock in the second frame with respect to the reference frame. The motion estimation engine 205 searches for matching blocks of the second frame in the reference frame stored in the external memory 115. The search can be performed by accessing the reference frame using one of a growing window, a sliding window or a combination of a growing and sliding window (hybrid window). One or more motion vectors generated by the motion estimation engine can be used to predict the second frame from the reference frame. The motion vectors are then utilized by the motion compensation engine 210 to predict the second frame from the reference frame. The second frame is then represented as a transformation of the reference frame using the motion compensation engine 210 and the subtractor 255, During the inter-prediction mode, the first mode switch is operable to receive data corresponding to the second frame from the subtractor 255. The second frame is then converted to frequency domain using the discrete cosine transform (DCT) unit 215, quantized using the quantization unit 220 and encoded by the encoding unit 225 as part of the encoded bit stream. In the video compression techniques, a plurality of I-frames and subsequent P-frames are encoded as described herein.

Figure 3:
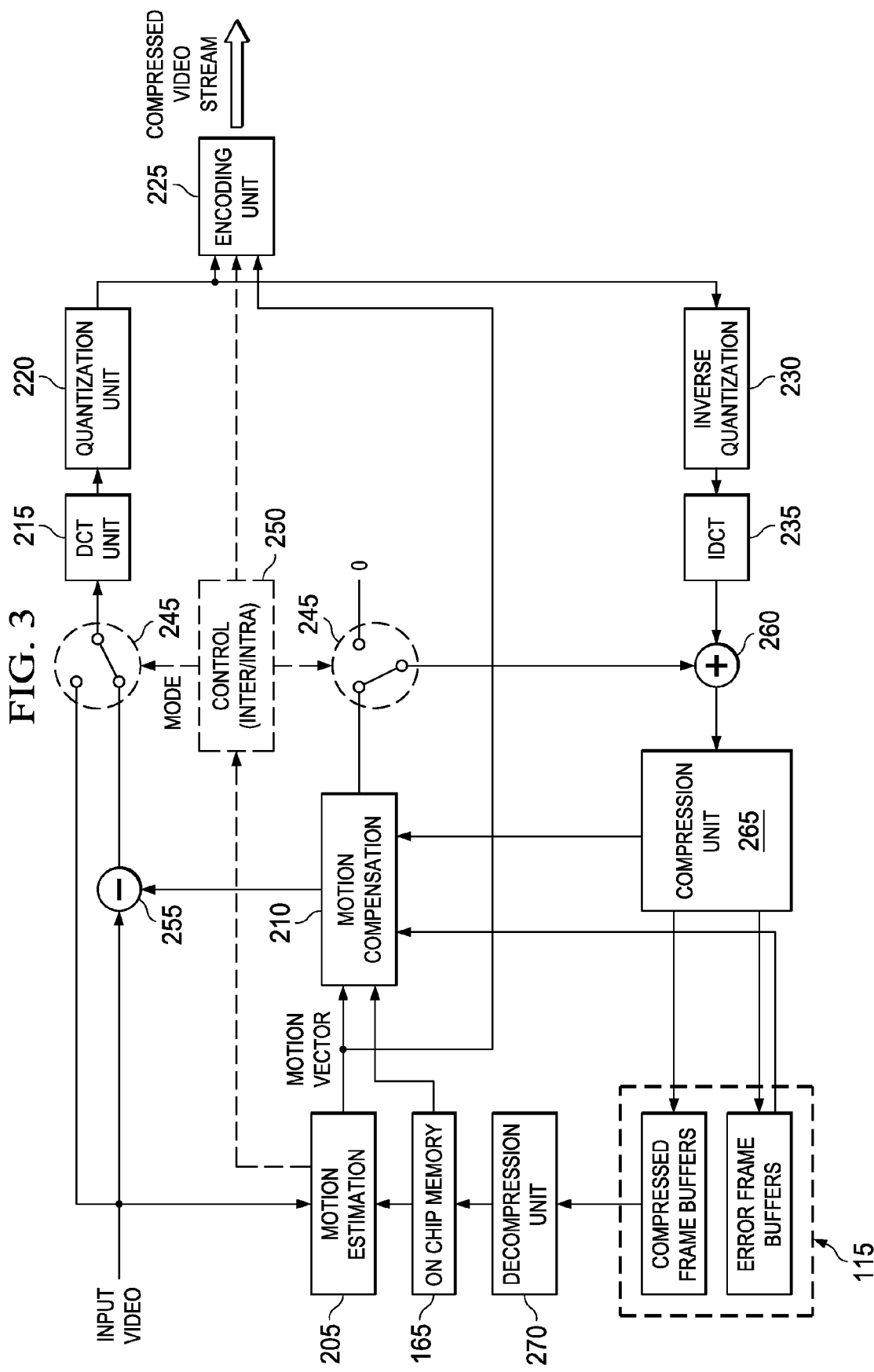
FIG. 3 is a block diagram of a video encoder for performing motion estimation on compressed data, in accordance with yet another embodiment.

In another embodiment as illustrated in FIG. 3, the plurality of frames after reconstruction is compressed using a compressing unit 265 and then stored as a compressed frame in the external memory 115. The compressing unit 265 represents the reference frame as the compressed frame and an error frame in the external memory 115. The error frame is represented as the difference between the reference frame and the compressed frame. The error frame buffer may be used by the motion compensation engine 210. Example of the compression algorithms includes scalar quantization, intra-prediction based scalar quantization or any lossy/lossless compression algorithm. A decompressing unit 270 is used to decompress the compressed frame, and provide the decompressed reference frame to the motion estimation engine 205. The video encoder 140 including the motion estimation engine 205, the motion compensation engine 210, discrete cosine transform (DCT) unit 215, the quantization unit 220, the encoding unit 225, the inverse quantization unit 230, the inverse DCT unit 235, the control unit 250, the compressing unit 265 and the decompressing unit 270. Here, the compressing unit 265 is coupled to the adder 260. In one embodiment, the compressing unit 265 can be a scalar quantization unit. The scalar quantization unit maps one sample of input signal to one quantized output. The external memory 115 stores the reference frames and their compressed frames. Further, the on-chip memory 165 is in communication with the motion estimation engine 210 through decompressing unit 270. Further, the on-chip memory 165 is also in communication with the motion compensation engine 210 directly.

As previously discussed, the reference frame is compressed using the compressing unit 265 and then stored in the external memory 115. Here, the reference frame is compressed and stored as the compressed frame buffer and the error frame buffer. The second frame received at 200 is coded as a representation from the reference frame (first frame). The motion estimation engine 205 performs a search for matching blocks of the second frame with the blocks in the reference frame stored in the on-chip memory 165. The search can be performed by accessing the reference frame using one of the growing window, the sliding window or the combination of the growing and the sliding window (hybrid window) techniques. The reference frame is accessed from the external memory 115. The compressed frame is decompressed using a decompressing unit 270 prior to accessing by the motion estimation engine 205. One or more motion vectors generated by the motion estimation engine can be used to predict the second frame from the reference frame. The motion vectors, uncompressed pixels and the error frame are then utilized by the motion compensation engine 210 to predict the second frame from the reference frame. The second frame is then represented as a transformation of the reference frame using the motion compensation engine 210 and the subtractor 255. The second frame is then converted to frequency domain and quantized prior to encoding by the encoding unit 225. Similarly, one or more frames subsequent to the reference frame are coded using the reference frame.

Figure 4:
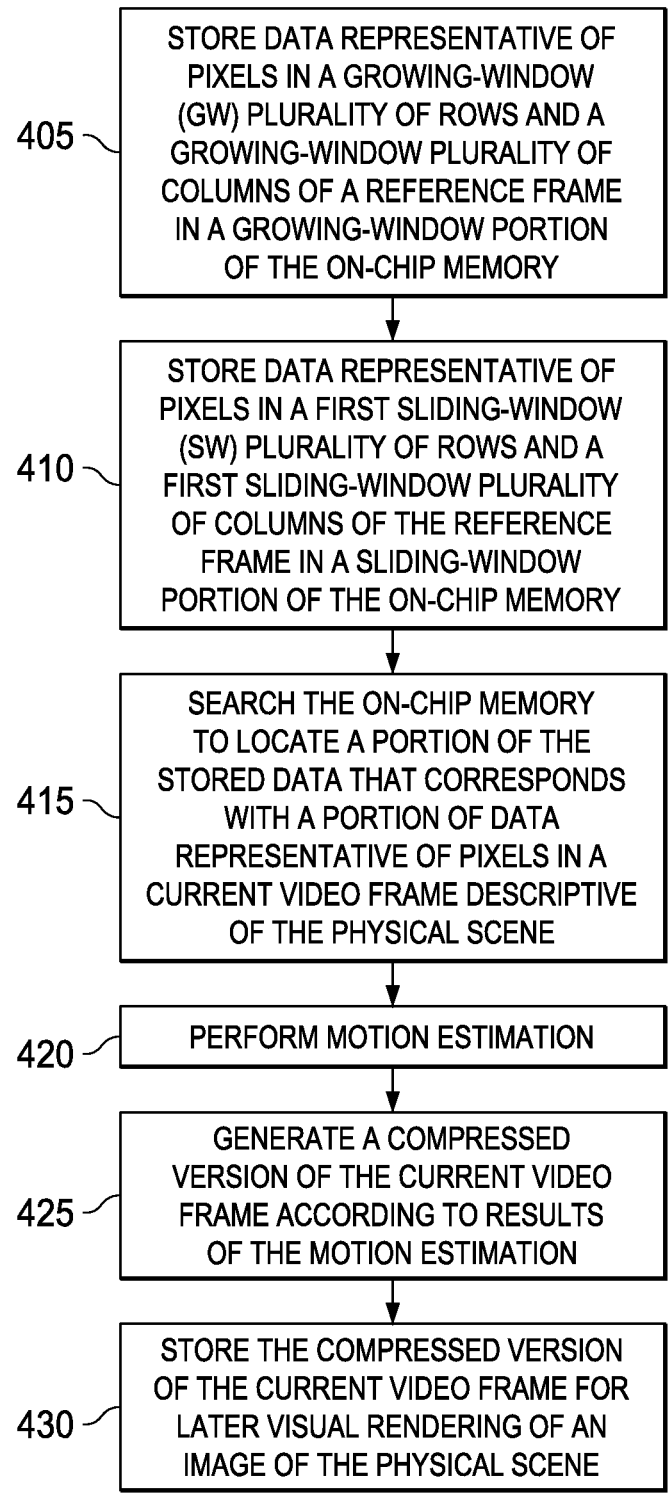
FIG. 4 is a flowchart illustrating a method for compressing a video signal, in accordance with one embodiment.
Figure 5:
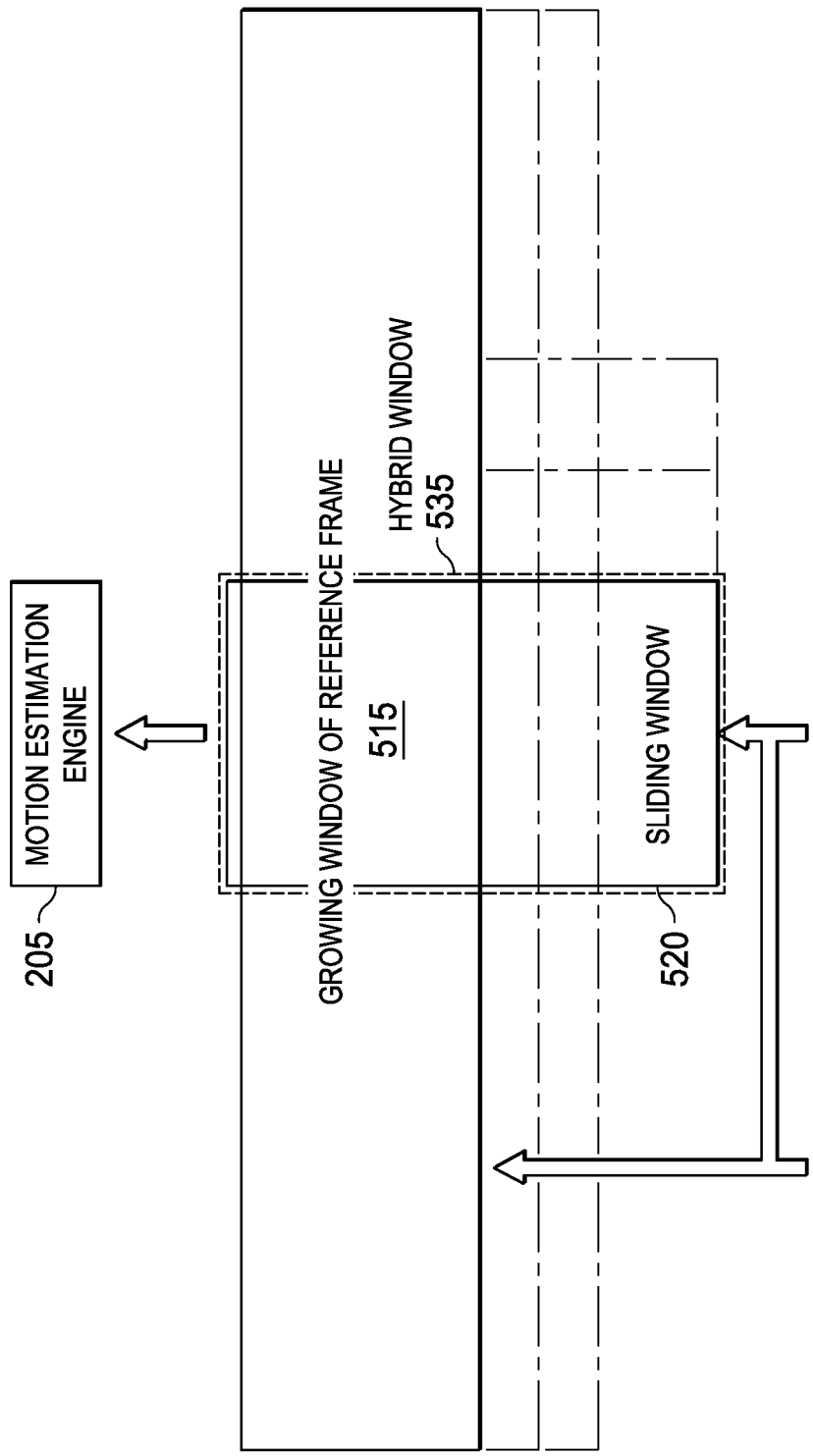
FIG. 5 is a schematic representation of a hybrid window technique, in accordance with one embodiment.

Referring to FIGS. 4 and 5 now, video compression is performed in a video processing unit, for example the processing unit 105. In an embodiment, the video compression is performed on a video signal that represents a physical scene in a video encoder having an on-chip memory. The video signal includes a plurality of frames.

The video compression is performed using motion estimation and motion compensation resulting in reduced bandwidth requirements and reduced memory requirements. The motion estimation includes searching for a best match of pixels of a current frame in a block of pixels of a reference frame. The pixels of the reference frame are accessed from the on-chip memory. In one embodiment, the pixels are accessed based on a hybrid window technique.

At step 405, data representative of pixels in a GW plurality of rows and a GW plurality of columns of the reference frame are stored in a GW portion of the on-chip memory. In an embodiment, the GW portion corresponds to a circular buffer of addresses in a vertical direction.

In one embodiment, the GW plurality of rows can include at least as many rows as a row dimension of a predefined pixel block but less than all the rows of the reference frame, and the GW plurality of columns includes at least as many columns as a column dimension of the predefined pixel block.

At step 410, data representative of pixels in a first SW plurality of rows and a first SW plurality of columns of the reference frame are stored in a SW portion of the on-chip memory. In an embodiment, the SW portion corresponds to circular buffer of addresses in a horizontal direction.

In one embodiment, the first SW plurality of rows can exclude any row in the GW plurality of rows (e.g. FIG. 5). In another embodiment, the first SW plurality of rows includes rows in the GW plurality of rows and the first SW plurality of columns excludes any column of the GW plurality of columns (e.g. FIG. 10).

In some embodiments, the number of rows in the GW plurality of rows and the number of rows in the first SW plurality of rows are apportioned to minimize a bandwidth of data flow into the on-chip memory from a memory external to the video encoder.

In some embodiments, the data to be stored in the GW portion of the memory includes data transferred from the SW portion of the on-chip memory. In another embodiment, data to be stored in the SW portion of the memory includes data transferred from GW portion of on-chip memory.

In one embodiment, the first SW plurality of columns includes at least as many columns as the column dimension of the predefined pixel block but less than all the columns of the reference frame and the first SW plurality of columns includes portions of each row of the first SW plurality of rows, the first SW plurality of rows including at least as many rows as the row dimension of the predefined pixel block but less than all the rows of the reference frame.

At step 415, the on-chip memory is searched to locate a portion of the stored data that corresponds with a portion of data representative of pixels in a current video frame descriptive of the physical scene.

For the portion of data in the current frame, a search is performed within blocks of data in the reference frame by a motion estimation engine, for example the motion estimation engine 205 (see FIG. 5). The blocks of reference frame data are stored in the on-chip memory. The search is performed by accessing the blocks of data in the GW portion and the SW portion of the on-chip memory. For every access made in the on-chip memory, it is determined if the address falls in the SW portion or the GW portion. Modulo-addressing can be implemented for accessing the blocks of data in the SW portion and the GW portion respectively.

At step 420, motion estimation is performed. The motion estimation includes matching pixels or a block of pixels of a current frame with pixels in a reference frame and generating one or more motion vectors. The motion vectors represent spatial displacement of the pixels or the block of pixels of the current frame with reference to the pixels in the reference frame. The motion vectors can then be used to predict the current frame from the reference frame by defining pixel values of the current frame based on the displacement of the pixel values from the reference frame. Existing motion estimation techniques can be used to generate the motion vectors.

The steps 415 through 420 are repeated for each block of data in the current frame.

At step 425, a compressed version of the current video frame is generated according to results of the motion estimation. The compressed version of the current video frame is represented by differences with respect to the matching blocks (obtained by motion estimation) from the reference frame.

In one example, plurality of motion vectors are generated for the current frame based on the reference frame. The plurality of motion vectors are encoded to create a transformation of the reference frame that represents the current frame. The transformation can be achieved by creating a difference frame of the current frame and the reference frame and encoding the motion vectors and the difference frame. Here, the motion vectors denote the motion of objects from the reference frame to the current frame. Existing motion compensation techniques can be used to generate the compressed version of the current video frame using the motion vectors and the reference frame.

At step 430, the compressed version of the current video frame is stored for later visual rendering of an image of the physical scene.

In an embodiment, the compressed version of the current video frame can be represented as an encoded bit stream. Various techniques like Huffman coding, Lempel-Ziv coding and arithmetic coding can be used to generate the bit stream.

In an embodiment, the reference frame is pre-processed using scalar quantization technique prior to storing it to external memory. The pre-processing of the reference frame is based on an intra-prediction technique. The intra-prediction technique includes predicting values of pixels within blocks of the reference frame from the neighboring block pixels. More than one intra prediction modes can be used. A prediction mode can be chosen based on minimum prediction error. Then, differences are computed between the value of pixels in one of the block and the values of pixels in a neighboring block. The computed difference is then quantized in one of a finite number of quantum values.

In another embodiment, the reference frame is pre-processed to compress the reference frame using scalar quantization technique. Compressing of the reference frame includes storing the reference frame using a compressed frame and an error frame in the external memory. The compressed frame is indicative of a frame represented using a reduced number of bits per pixel. The error frame is indicative of a frame represented using difference between the pixels in the reference frame and the compressed frame. During motion estimation, the compressed frame is decompressed. Decompressed reference frame is accessed for generating the motion vectors for the current frame. The motion vectors, decompressed reference frame and the error frame are utilized for the motion compensation to generate the reconstructed reference frame pixels.

Figure 11:
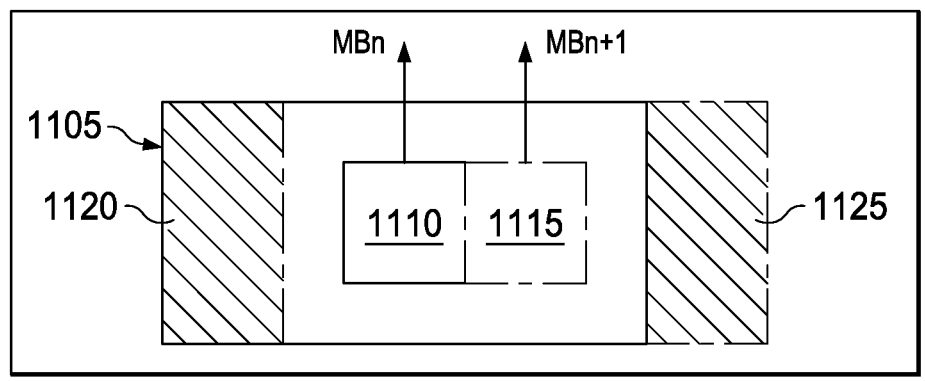
FIG. 11 illustrates a sliding window in accordance with one embodiment.
Figure 12:
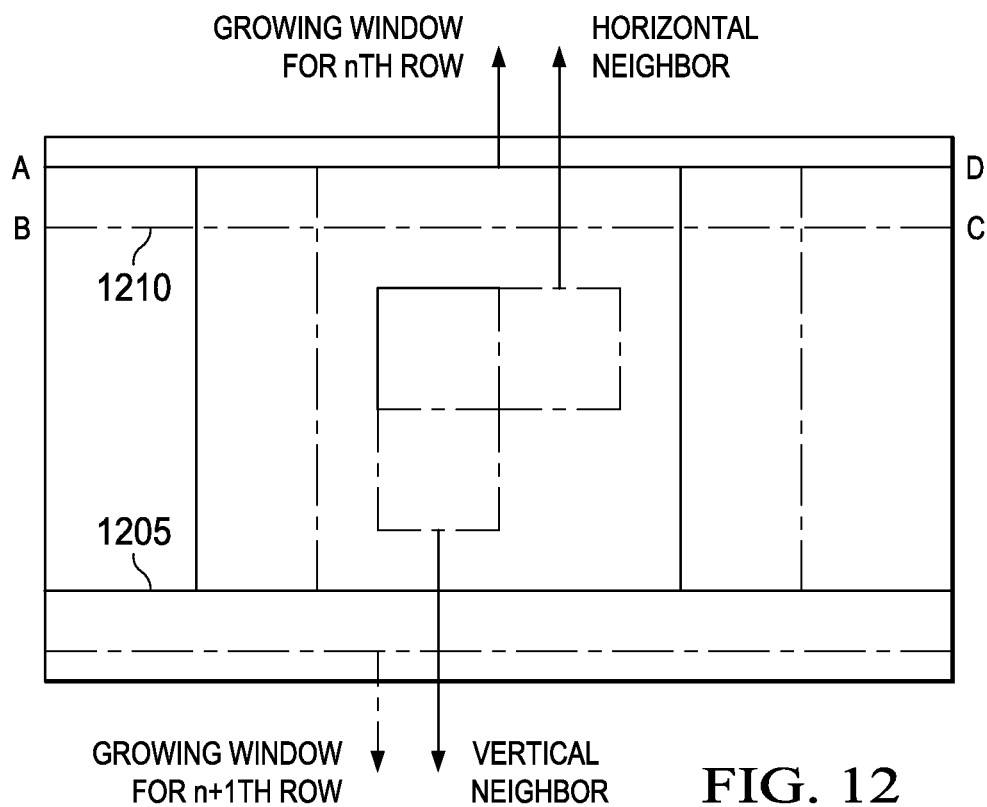
FIG. 12 illustrates a growing window in accordance with one embodiment.

A hybrid window is illustrated in FIG. 5. For a better understanding of hybrid window technique, concepts of sliding window (SW) and growing window (GW) and are explained now as illustrated in FIG. 11 and FIG. 12 respectively. Motion estimation is performed on macro-blocks in a current frame in raster-scan fashion. Search window for macro-block which is to the right (bottom) of current macro-block, is shifted to the right (bottom) of the current search window by one macro-block position. In sliding window (1105) implementation, as the search window moves to the right for next macro-block (from 1110 to 1115) in raster order, columns of pixels (equal to macro-block width) on the left of the SW (1120) are discarded while, a new set of columns of pixels (equal to the macro-block width) (1125) are added to the right of the SW. Sliding window (1105) implements modulo-addressing in horizontal direction. A sliding window exploits horizontal overlap in search windows for macro blocks horizontally adjacent to each other. A growing window (1205) stores the search windows necessary for entire row of macro-blocks in on chip memory. On finishing motion estimation process for one row of macro-blocks, the GW shifts downwards by 1 macro-block (1205 to 1210) position. When GW shifts from 1205 to 1210, the portion (created by the rows of pixels) that is rectangle ABCD in FIG. 12 is discarded. A GW search window exploits horizontal as well as vertical overlaps between search windows as illustrated in FIG. 12. A GW implements modulo-addressing in the vertical direction. Referring again to FIG. 5, a hybrid window technique is shown. The hybrid window 535 includes a growing window (GW) 515 and a sliding window (SW) 520. A window can be defined within a reference frame as a predefined area that is considered for motion estimation. The reference frames are stored in an external memory 115. Portions of the on-chip memory 165 are assigned for the GW 515 and the SW 520.

The search window for a macro-block in current frame belongs partially to GW portion and partially to SW portion in the hybrid window 535. A block of reference data accessed from the hybrid window 535 by motion estimation engine can thus be partially accessed from SW 520 and partially from the GW 515. The hybrid window 535 thus implements both horizontal and vertical modulo-addressing in SW and GW portions respectively. For each word inside the reference block being accessed from hybrid window 535, a check is performed to see if the word belongs to SW or GW portion of the hybrid window 535. The word is then accessed from the appropriate portion of the memory, using appropriate addressing scheme.

In another embodiment, discarded blocks of data from the SW 520 are utilized by the GW 515 during a subsequent search as shown in FIG. 6. For example, the bracket 605 refers to a net search window of current macro-block search and the bracket 610 refers to a net search window of the next macro-block. Data 615 is discarded from the GW 515, and data 620 is discarded from the SW 520. After the current macro-block search, data 625 discarded from the SW 520 can be utilized in the new row of data of the GW 515. As shown in FIG. 6, for subsequent searches, blocks of data discarded from the SW 520 can be utilized to fill the entire new row of data. Thus, external memory accesses are reduced.

Referring to FIG. 7, a compressed growing window technique is illustrated. The on-chip memory includes a growing window 705 to stored compressed reference data accessed from the external memory, and a sliding window 710 to perform the search. Compression of reference frame may have been performed using scalar quantization. Portions of the on-chip memory 165 are assigned for the GW 705 and the SW 710, for example a set of addresses is assigned to the SW 710 and another set of addresses is assigned to the GW 705. The SW 710 stores decompressed information of compressed reference data stored in the growing window. Prior to motion estimation for current macro-block, the decompression unit 270 accesses the search window for current macro-block from the GW memory and stores it to the SW after decompressing it. Since the growing window stores compressed reference, the on-chip memory requirement for growing window is reduced. For example, if compression ratio of 2 was used on the reference frame, the on-chip memory requirement for growing window is reduced by half. Also, the external memory bandwidth required to fill the growing window is reduced by half.

The reference frame is compressed by means of a scalar quantization. Scalar quantization is performed using the steps as described now. The reference frame is divided into a plurality of blocks of size m*n pixels P (i,j), where m is width of the block and n is the height of the block, P(i, j) is the value of the pixel in 'i' th row and 'j' th column in the block. Pixels in the block can be predicted using the pixels in a neighboring block (for example left block as shown in FIG. 9). Since the pixels in neighboring blocks are typically correlated to the pixels in the current block, the predicted image will match closely with the actual pixel values in the current block. Accuracy of prediction can be increased by allowing more than one prediction modes (e.g. using pixels from top neighboring block instead of left). In such an embodiment, prediction mode information can then be stored along with the compressed reference frame. For each of the plurality of blocks, differences between the pixel values of the block and the pixel values in a neighboring block is determined which can be expressed as $D(i,j)=N(j)-P(i,j)$, where $N(j)$ is the rightmost column of the left neighboring block. In another embodiment, neighboring pixels could be obtained from the bottom most row of the of the top neighboring block which can be expressed as $N(i)$. The maximum and minimum pixel value differences; max $(D(i,j))$, min $(D(i,j))$ are then determined. The differences of each of the difference values from the minimum difference value $d(i,j)=D(i,j)-\min(D(i,j))$ are then found. Finally, the computed differences $d(i,j)$ are quantized in one of a finite number of quantum values dq $(i,j)$. The number of quantum values depends upon the number of bits allocated for each compressed pixel difference. Compression ratio can be controlled by varying the number of bits for each compressed pixel difference.

The blocks of data corresponding to relevant portion of the compressed reference frame are then stored in the GW 705. When the block of data is to be read from the GW 705, the block of data is decompressed and stored in an uncompressed search window. The uncompressed search window can be either a sliding window or a hybrid window. For example, it can be a sliding window SW 710 as shown in FIG. 7. The motion estimation engine 205 then reads the block of data from the SW 710 and performs matching for the block of data. Subsequently, a motion vector can be generated for a matched block of data with reference to the reference frame. Similarly, the search is performed for subsequent blocks of data in the current frame.

FIG. 9 illustrates an intra-prediction based scalar quantization for compressing a reference frame. The reference frame includes a plurality of pixel values grouped in block.

Consider a scalar quantized block 905 of size 4×4 with compression ratio of 2. The block 905 has a horizontal edge with the top half of the block 905 having pixel values 100 and the bottom half having pixel values 50. The pixels can be predicted in the block 905 using the pixels of the neighboring blocks. Here, pixel values of a left neighboring block 910 are identified. Since the pixels in the left neighboring block 910 are correlated to the pixels in the block 905, the block 905 is represented using the pixels of the neighboring block as block 915. Here, the maximum and minimum value of pixels is zero. Retrospectively, pixel range and quantization error are very small. One or more bits of the compressed block 920 can be used to indicate the type of prediction. During decompression, the pixel values of the block 905 are predicted using the neighboring block 910.

Prediction using horizontal or vertical neighbor pixels can be performed and the prediction that results in smaller overall quantization error can be chosen. One or more bits of the compressed block 920 can be used to indicate the type of prediction.

Quantization error block e(i,j) (925) can be obtained by decompressing the compressed block 920 and subtracting it from the original block 905. Both the compressed block and error block can then be stored to external memory. While the compressed blocks from reference frame can be read during motion estimation process, the error blocks can be read during motion compensation process.

In some embodiments, a hybrid window may consist of a GW (805) in the center and two SWs at the top (825) and bottom (810) as shown in FIG. 8. This scheme results in majority of reference accesses made by motion estimation engine falling in the central GW region, and fewer accesses from SW region. This results in less number of access transitions from one window region to another, and results in better access efficiency (lesser memory conflicts).

FIGS. 10a and 10b provide a schematic representation of another hybrid window technique, in accordance with one embodiment.

As in FIG. 10a, block 1005 refers to a width of a reference frame in the on-chip memory 165. Motion estimation accesses the reference frame using a GW 1010 and a SW 1015. A set of addresses corresponding to data in the vertical direction 1020 of the reference frame is assigned to the GW 1010. Another set of addresses corresponding to data in the horizontal direction 1025 is assigned to the SW 1015. For a motion estimation search, the GW 1010 is moved in the vertical direction 1020 and the SW 1015 is moved in the horizontal direction 1025 of width of the reference frame to read the required information.

In some embodiments, the data corresponding to the reference frame is assigned to the addresses of both the GW 1010 and the SW 1015 (see FIG. 10b). In such a situation, the data can be read from one of the GW 1010 and the SW 1015.

Various embodiments of the hybrid window technique and the scalar quantization based growing window technique have been disclosed. These embodiments provide a system that is both memory efficient and bandwidth efficient.

In the foregoing discussion, the term "coupled or connected" refers to either a direct electrical connection or mechanical connection between the devices connected or an indirect connection through intermediary devices.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to avoid obscuring the disclosure. Other variations and embodiments are possible in light of above teachings, and it is thus intended that the scope of disclosure not be limited by this Detailed Description, but only by the Claims.

What is claimed is:

1. A method of compressing a video signal that represents a physical scene in a video encoder having an on-chip memory, the method comprising:
   in a growing-window (GW) portion of the on-chip memory, storing data representative of pixels in a GW plurality of rows and a GW plurality of columns of a reference frame, the GW portion corresponds to a circular buffer of addresses in a vertical direction;
   in a sliding-window (SW) portion of the on-chip memory, storing data representative of pixels in a first SW plurality of rows and a first SW plurality of columns of the reference frame, the SW portion corresponds to a circular buffer of addresses in a horizontal direction;
   searching the on-chip memory to locate a portion of the stored reference frame data that corresponds with a portion of data representative of pixels in a current video frame descriptive of the physical scene, the searching including searching a reference block of data words in a hybrid window implementing both horizontal and vertical modulo-addressing in GW and SW portions of the on-chip memory, respectively, for each word inside the reference block in the hybrid window, the searching including determining if the word corresponds to a GW or a SW portion of the hybrid window and then accessing the word using an appropriate addressing scheme;
   performing motion estimation; and
   generating a compressed version of the current video frame according to results of the motion estimation.

2. The method as in claim 1, in which the first SW plurality of rows excludes any row in the GW plurality of rows and in which storing data representative of pixels in a GW plurality of rows and a GW plurality of columns and storing data representative of pixels in a first SW plurality of rows and a first SW plurality of columns forms a hybrid window.

3. The method as in claim 2 including: in the SW portion of the on-chip memory, storing data representative of pixels in a second SW plurality of rows and a second SW plurality of columns of the reference frame, the second SW plurality of rows excluding any row in the GW plurality of rows and the first SW plurality of rows.

4. The method as in claim 1 including storing the compressed version of the current video frame for later visual rendering of an image of the physical scene.

5. The method as in claim 3 in which: storing data in GW portion of the memory includes transferring data from the first SW plurality of rows to the GW plurality of rows, and storing data in the SW portion of the memory includes transferring data from the GW plurality of rows to the second SW plurality of rows.

6. The method as in claim 1 in which the first SW plurality of rows includes rows in the GW plurality of rows and the first SW plurality of columns excludes any column of the GW plurality of columns.

7. The method as in claim 1 including apportioning the number of rows in the GW plurality of rows and the number of rows in the first SW plurality of rows to optimize a bandwidth of data flow into the on-chip memory from a memory external to the video encoder.

8. The method as in claim 1 in which storing data in GW portion of the memory includes storing a portion of compressed reference frames; and uncompressing the compressed GW to form another search window of uncompressed pixels, in which the another search window is at least one of a sliding window and a hybrid window.

9. The method as in claim 1 including compressing the reference frame by scalar quantization prior to storing data representative of pixels of the reference frame.

10. The method as in claim 9 in which compressing by scalar quantization includes pre-processing the reference frame by intra-prediction.

11. The method as in claim 9 in which scalar quantization includes dividing the reference frame into a plurality of blocks of size m*n pixels $P(i,j)$, for each of the plurality of blocks: computing differences between the pixel values of the block and the pixel values in a neighboring block; determining maximum and minimum pixel value differences; finding the differences of each of the difference values from the minimum difference; and quantizing the computed differences in one of a finite number of quantum values.

* * * * *